(12) United States Patent
Benisty (10) Patent No.: US 10,740,243 B1
(45) Date of Patent: Aug. 11, 2020

(54) STORAGE SYSTEM AND METHOD FOR PREVENTING HEAD-OF-LINE BLOCKING IN A COMPLETION PATH

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/410,116

(22) Filed: May 13, 2019

(51) Int. Cl.
  *G06F 12/08* (2016.01)
  *G06F 12/0875* (2016.01)

(52) U.S. Cl.
  CPC .. *G06F 12/0875* (2013.01); *G06F 2212/1044* (2013.01)

(58) Field of Classification Search
  CPC ...... G06F 3/061; G06F 3/0655; G06F 3/0659; G06F 3/0673; G06F 3/0679; G06F 12/0875; G06F 2003/0691; G06F 2212/1044
  USPC .......................... 710/52, 54, 56; 711/103, 141
  See application file for complete search history.

(56) References Cited

U.S. PATENT DOCUMENTS

| | | | |
|---|---|---|---|
| 9,626,309 B1 | 4/2017 | Burke et al. | |
| 10,114,586 B1 * | 10/2018 | Benisty | G06F 3/061 |
| 2005/0002334 A1 | 1/2005 | Chao et al. | |
| 2015/0081956 A1 * | 3/2015 | Vucinic | G06F 3/0656 |
| | | | 711/103 |
| 2016/0117119 A1 * | 4/2016 | Kim | G06F 13/1642 |
| | | | 711/103 |
| 2017/0199765 A1 | 7/2017 | Ahn et al. | |
| 2017/0322897 A1 | 11/2017 | Benisty et al. | |
| 2019/0250848 A1 * | 8/2019 | Benisty | G06F 3/0659 |

OTHER PUBLICATIONS

International Search Report and Written Opinion in Application No. PCT/US2019/067450, dated Apr. 23, 2020, 7 pages.
"NVMe/TCP needs good TCP network design" by Chris Mellor; Feb. 5, 2019; downloaded from the Internet at https://blocksandfiles.com/2019/02/05/nvme-tcp-needs-good-tcp-network-design/ on Mar. 10, 2019; 4 pages.

* cited by examiner

*Primary Examiner* — Gary J Portka
(74) *Attorney, Agent, or Firm* — Brinks Gilson & Lione (57) ABSTRACT

A storage system and method are provided for preventing head-of-line blocking in a completion path. In one embodiment, a storage system is provided that is configured to: determine that a completion queue in a host is too full to store a completion entry; in response to determining that the completion queue in the host is too full to store the completion entry, temporarily store the completion entry in a data structure in the storage system; determine that space has become available in the completion queue in the host to store the completion entry; and in response to determining that space has become available in the completion queue in the host to store the completion entry, store, in the completion queue in the host, the completion entry that was temporarily stored in the data structure in the storage system.

20 Claims, 7 Drawing Sheets

STORAGE SYSTEM AND METHOD FOR PREVENTING HEAD-OF-LINE BLOCKING IN A COMPLETION PATH

BACKGROUND

Non-Volatile Memory (NVM) Express (NVMe) is a standard for accessing non-volatile storage media attached via a Peripheral Component Interconnect (PCI) Express (PCIe) bus. NVMe may be used with a variety of non-volatile storage media, such as solid state drives (SSDs). One focus of NVMe relates to input/output communication between a host device (which may access and/or write to the non-volatile storage media) and a storage system (which includes the non-volatile storage media). In that regard, NVMe implements a paired submission queue and completion queue mechanism, with host software on the host device placing commands into the submission queue. Completions are placed onto the associated completion queue by the storage system controller.

DETAILED DESCRIPTION

Overview

By way of introduction, the below embodiments relate to a storage system and method for preventing head-of-line blocking in a completion path. In one embodiment, a storage system is provided comprising a memory configured to store a data structure and a controller. The controller is configured to: determine that a completion queue in a host is too full to store a completion entry; in response to determining that the completion queue in the host is too full to store the completion entry, temporarily store the completion entry in the data structure in the storage system; determine that space has become available in the completion queue in the host to store the completion entry; and in response to determining that space has become available in the completion queue in the host to store the completion entry, store, in the completion queue in the host, the completion entry that was temporarily stored in the data structure in the storage system.

In some embodiments, the controller is further configured to temporarily store the completion entry in the data structure in the storage system in response to there being available space in the data structure and/or in response to a threshold not being exceeded for the data structure.

In some embodiments, the controller is further configured to stopping fetching commands from a submission queue in the host until space is available in the completion queue and/or the data structure.

In some embodiments, the controller is further configured to: in response to receiving a doorbell update to the completion queue from the host: block completion entries from being posted to the completion queue; update a head pointer of the completion queue; determine if there are any pending completion entries in the data structure; and in response to determining there are no pending completion entries in the data structure, unblock completion entries from being posted to the completion queue.

In some embodiments, the controller is further configured to: in response to determining that there are pending completion entries in the data structure: select a completion entry from the data structure; update a tail pointer based on a number of completion entries in the data structure and post aggregated entries to the completion queue; enable fetching from a submission queue in the host; and unblock completion entries from being posted to the completion queue.

In some embodiments, the memory comprises a three-dimensional memory.

In some embodiments, the storage system is embedded in the host.

In some embodiments, the storage system is removably connected to the host.

In another embodiment, a method for preventing head-of-line blocking in a completion path is provided that is performed in a storage system in communication with a host, wherein the host comprises a submission queue and a completion queue. The method comprises: determining whether a completion queue entry can be posted to the completion queue; in response to determining that the completion queue entry can be posted to the completion queue, allocating an entry in the completion queue and fetching a command from the submission queue; and in response to determining that the completion queue entry cannot be posted to the completion queue, allocating an entry in a completion data structure in the storage system and fetching a command from the submission queue.

In some embodiments, the storage system allocates the entry in the completion queue by updating a tail pointer.

In some embodiments, the method further comprises determining if there is available space in the completion data structure and/or if a threshold is not exceeded for the completion data structure, wherein an entry is allocated in the completion data structure in response to there being available space in the completion data structure and/or in response to the threshold not being exceeded.

In some embodiments, the method further comprises in response to determining that there is no available space in the completion data structure and/or in response to determining that the threshold has been exceeded, stopping fetching commands from the submission queue until space is available in the completion queue and/or the completion data structure.

In some embodiments, the method further comprises in response to receiving a doorbell update to the completion queue from the host: blocking completion entries from being posted to the completion queue; updating a head pointer of the completion queue; determining if there are any pending completion entries in the completion data structure; and in response to determining there are no pending completion entries in the completion data structure, unblocking completion entries from being posted to the completion queue.

In some embodiments, the method further comprises in response to determining there are pending completion entries in the completion data structure: selecting a completion entry from the completion data structure; updating a tail pointer based on a number of completion entries in the completion data structure and post aggregated entries to the completion queue; enabling fetching from the submission queue; and unblocking completion entries from being posted to the completion queue.

In another embodiment, a storage system is provided comprising: means for determining that a completion queue in a host is too full to store a completion entry; means for in response to determining that the completion queue in the host is too full to store the completion entry, temporarily storing the completion entry in a data structure in the storage system; and means for in response to determining that space has become available in the completion queue in the host to store the completion entry, store, in the completion queue in the host, the completion entry that was temporarily stored in the data structure in the storage system.

In some embodiments, the method further comprises the storage system further comprises means for temporarily storing the completion entry in the data structure in the storage system in response to determining that there is available space in the data structure and/or in response to determining that a threshold is not exceeded for the data structure.

In some embodiments, the storage system further comprises means for blocking completion entries from being posted to the completion queue in response to receiving a doorbell update to the completion queue from the host.

In some embodiments, the storage system further comprises a three-dimensional memory.

In some embodiments, the storage system is embedded in the host.

In some embodiments, the storage system is removably connected to the host.

Other embodiments are possible, and each of the embodiments can be used alone or together in combination. Accordingly, various embodiments will now be described with reference to the attached drawings.

Embodiments

Figures 1A, 1B:
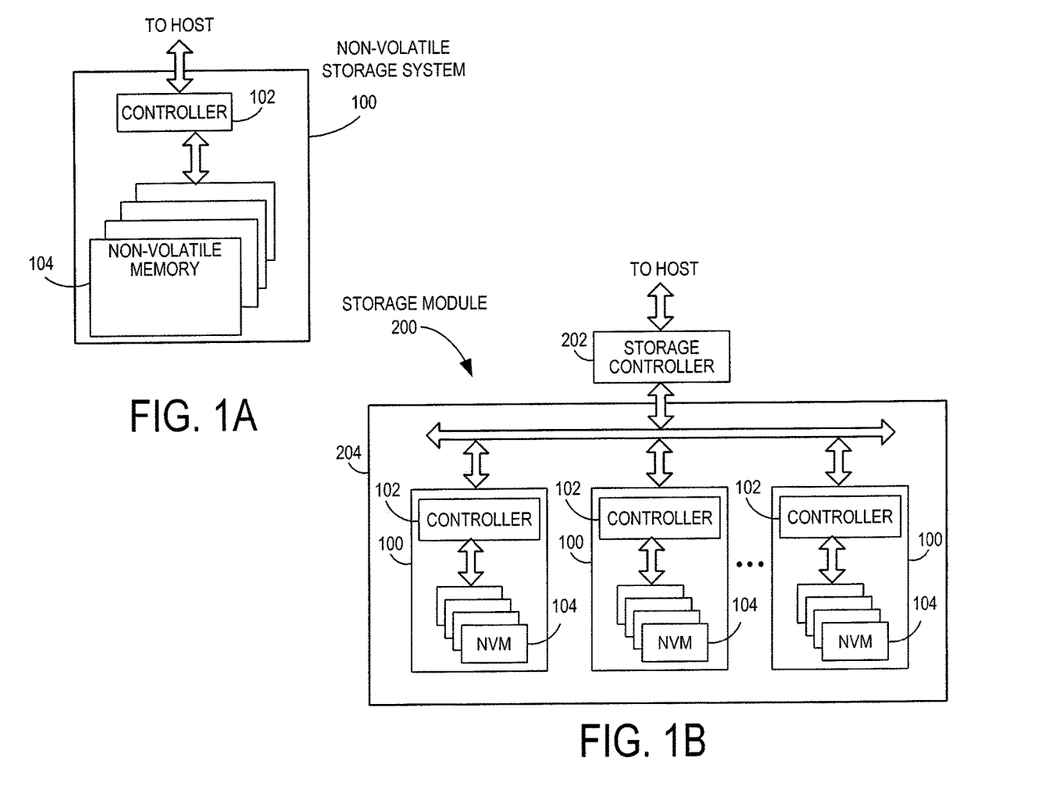
FIG. 1A is a block diagram of a non-volatile storage system of an embodiment.
FIG. 1B is a block diagram illustrating a storage module of an embodiment.
Figure 1C:
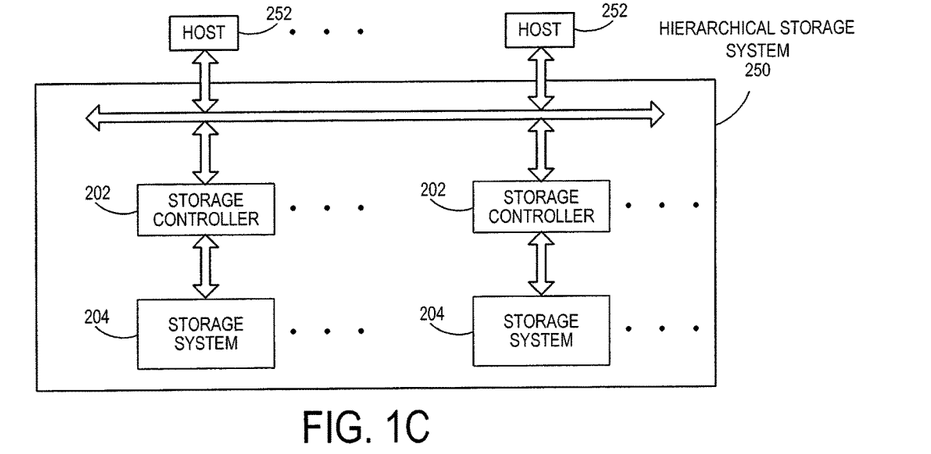
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
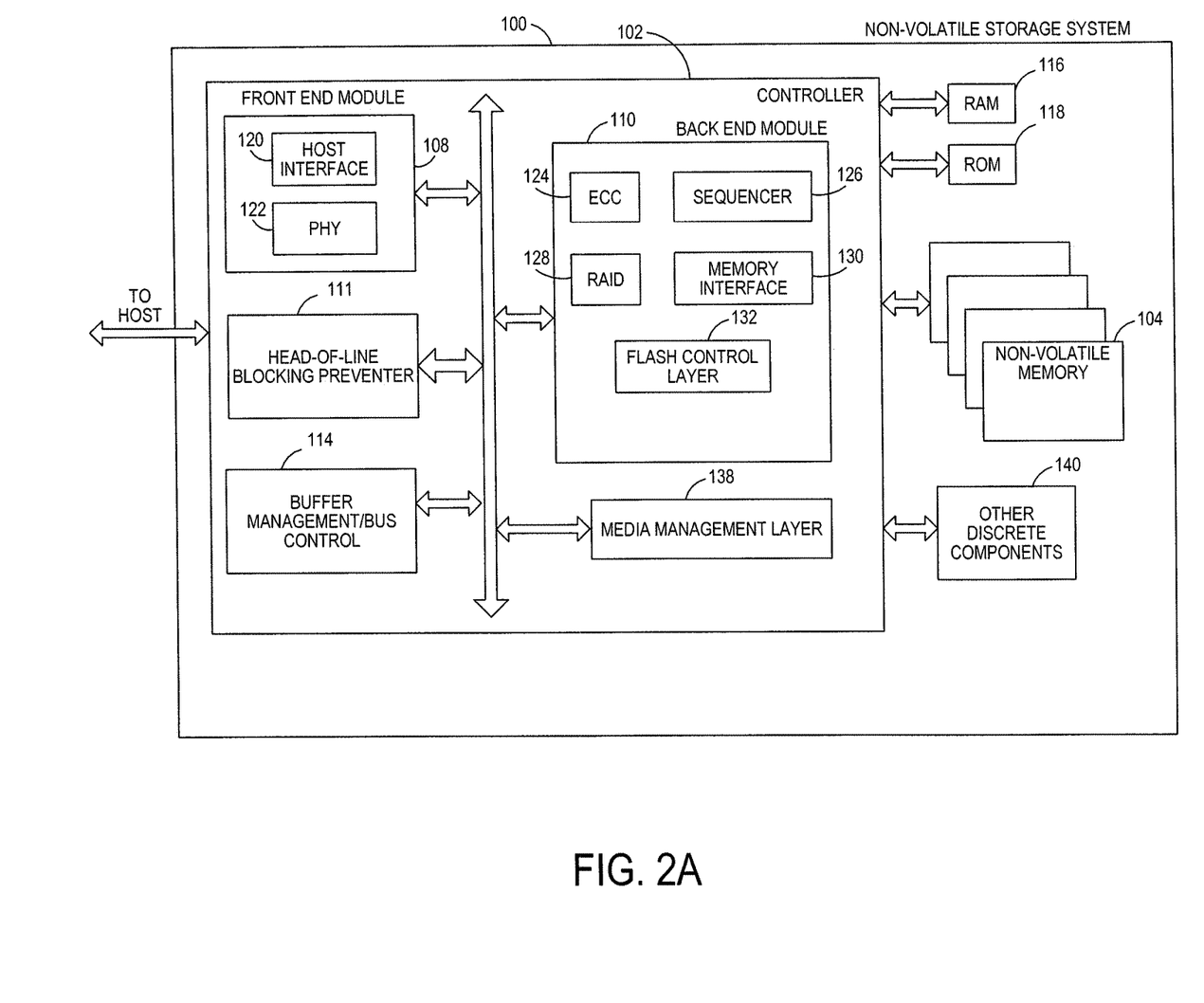
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a head-of-line blocking preventer 111, which is discussed in more detail below, and can be implemented in hardware or software/firmware. The head-of-line blocking preventer 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
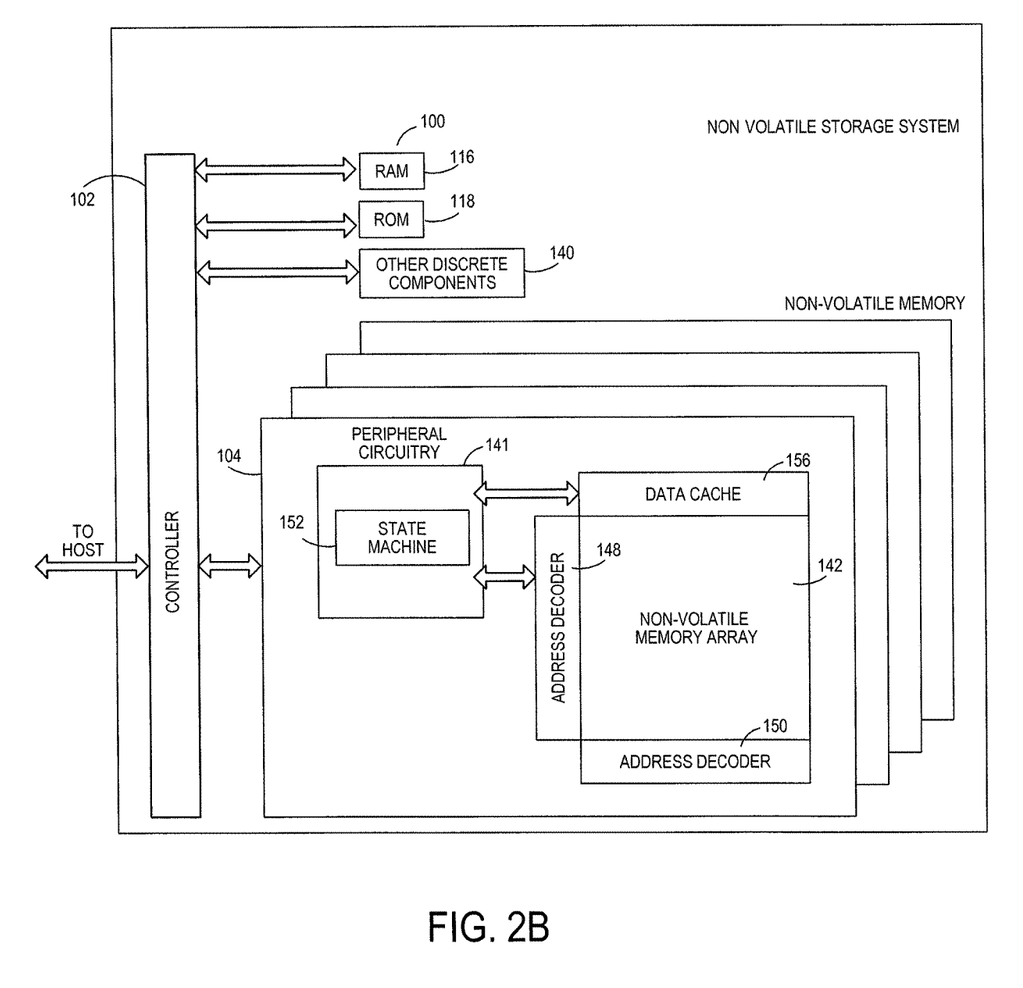
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

In one embodiment, the storage system 100 and host operate under the Non-Volatile Memory Express (NVMe) specification. NVMe is based on a paired submission and completion queue mechanism. Commands are placed by host software into a submission queue (SQ). Completions are placed into the associated completion queue (CQ) by the controller 102 of the storage system 100. In general, submission and completion queues are allocated in host memory. In one implementation, the submission queues and completion queues may have a 1:1 correlation, and in another implementation, the submission queues and completion queues do not have a 1:1 correlation.

For initialization, the host may notify the storage system 100 of the submission queue(s) and completion queue(s) by sending information, such as the base address for each queue to the storage system 100. In that regard, each submission queue has a corresponding completion queue. When the submission queue and the completion queue are resident in the host, the host can send information to the storage system 100 in order for the storage system 100 to determine the locations of the submission queue and the completion queue in the host. In a specific implementation, the host sends a command indicating the creation of the submission queue and the completion queue. The command may include a physical region pages (PRP)1 pointer, which is a pointer to a list on the host of the locations of the specific submission queue or the specific completion queue. In practice, the storage system 100 sends a transport layer packets (TLP) read request using the PRP1 in order to obtain the PRP list, and stores the PRP list in the storage system 100 to determine the memory locations within the host for use in future commands to read from the specific submission queue or write to the specific completion queue. Alternatively, the host may instruct the storage system 100 to create the submission queue(s) and corresponding completion queue(s) in a memory resident in the storage system 100, such as a controller memory buffer.

The submission queue may be based on a ring buffer, with a head pointer and a tail pointer. After creating the submission queue(s) and notifying the storage system 100 about the created submission queue(s), the host may write a command (or several commands) to the submission queue. In one implementation, the storage system 100 is unaware that the host has updated the submission queue, since the host updated its own memory. In another implementation (such as when the submission queue(s) and completion queue(s) are resident in the controller memory buffer), the storage system 100 may monitor a communication interface between the host and the storage system 100 for particular communications, such as writing to the submission queue(s) resident on the storage system 100. For example, the storage system 100 can monitor the transport layer packets (TLPs) on the PCI Express bus to determine whether the host has sent a TLP that results in an update to the submission queue resident in the controller memory buffer. In that regard, the storage system 100 may identify one or more entries being written to the submission queue(s).

The host then writes to a submission queue tail doorbell register in the storage system 100 to signal to the storage system 100 that the host queued one or more commands in this specific submission queue. The writing to the submission queue tail doorbell register may take one of several forms. In one way, the host indicates a new tail for the submission queue, thereby indicating the number of commands written to the submission queue. Thus, since the storage system 100 is aware of the base address for the submission queue, the storage system 100 only needs to know the tail address to indicate the number of new commands written to the submission queue. After a command (or a set of commands) is processed, the storage system 100 then sets the new head of the submission queue accordingly, so that the tail pointer may represent an "offset" from the head pointer. In another way, the host indicates a number of commands written to the submission queue. In practice, each submission queue has a corresponding submission queue tail doorbell register in the storage system 100, so that when the host updates a particular doorbell register (correlated to a particular submission queue), the storage system 100 can determine, based on the doorbell register, which particular submission queue has been updated.

After the storage system is notified of command(s) on the submission queue and before the storage system 100 fetches the command(s)), the storage system 100 is aware that there are command(s) pending in the submission queue. In the general case, there may be several submission queues (with potentially many pending commands in the several submission queues). Thus, the storage system controller 102 may arbitrate between the various submission queues to select the particular submission queue from which to fetch the command(s).

Responsive to determining which particular submission queue from which to fetch the command(s), the storage system 100 fetches the command(s) from the particular submission queue. In practice, the storage system 100 may access the base address of the particular submission queue plus the pointer on the current head pointer implemented in the host.

As discussed above, the submission queue or completion queue may be assigned an area of memory (such as in the host or in the controller memory buffer in the storage system 100). The submission queue and completion queues may include multiple entries, each associated with a specific command. The size of each entry may be a predetermined size, such as 64 kilobytes (Kb). In this regard, entries within the submission queue may be determined using the base address for the submission queue, and by offsetting the base address with the number of entries multiplied by the size of each entry (e.g., 64 Kb).

As discussed above, the storage system 100 is aware of the tail pointer, having been notified of it previously. Thus, the storage system 100 can obtain all of the new commands from the submission queue. In a submission queue resident in the host, the storage system 100 may send a TLP request to obtain the command(s) from the submission queue. Responsive to receipt of the TLP request, the host sends a completion TLP message with the commands in the submission queue. In this regard, the storage system 100 receives the command(s) from the submission queue.

The storage system 100 then processes the command (e.g., by parsing the command and determining the steps to execute the command (e.g., read/write/etc.)). After completing the data transfer associated with the command, the storage system controller 102 sends a completion message to the relevant completion queue. At the initialization phase, the host associates submission queues with completion queues, so that the host is aware of commands that are completed in the submission queue based on which completion queue the storage system 100 writes to. The completion message may contain information as to the processing of the command(s), such as whether the command was completed successfully or whether there was an error when executing the command.

At this point, the host is unaware that the storage system 100 posted to the completion queue. This is due to the storage system 100 causing data to be written to the completion queue. In that regard, the storage system 100 can notify the host that there has been an update to the completion queue. In particular, the storage system 100 posts an interrupt to the host. Responsive to receiving the interrupt, the host determines that there are one or more completion entries pending for the host in this completion queue and processes the entries in the completion queue. After the host processes the entries from the completion queue, the host notifies the storage system 100 of the entries that the host processed from the completion queue. This may be performed by updating a completion queue head doorbell register indicative to the storage system 100 that the host processed one or more entries from the completion queue. Responsive to updating the completion queue head doorbell register, the storage system 100 updates the head of the completion queue. Given the new head, the storage system 100 is aware as to which entries in the completion queue have already been processed by the host and may be overwritten.

One issue that can come up in NVMe is when a queue or other resource is shared between two workloads. In such a situation, without additional controls, one workload can fill the queue, and the storage system 100 (sometimes referred to herein as the "storage device" or "device") may need to process those commands before the other workload can be serviced. This issue is known as the head-of-line blocking issue. The following embodiments discuss a potential head-of-line blocking issue due to fullness of a completion queue. This scenario may be important to enterprise customers.

Figure 3:
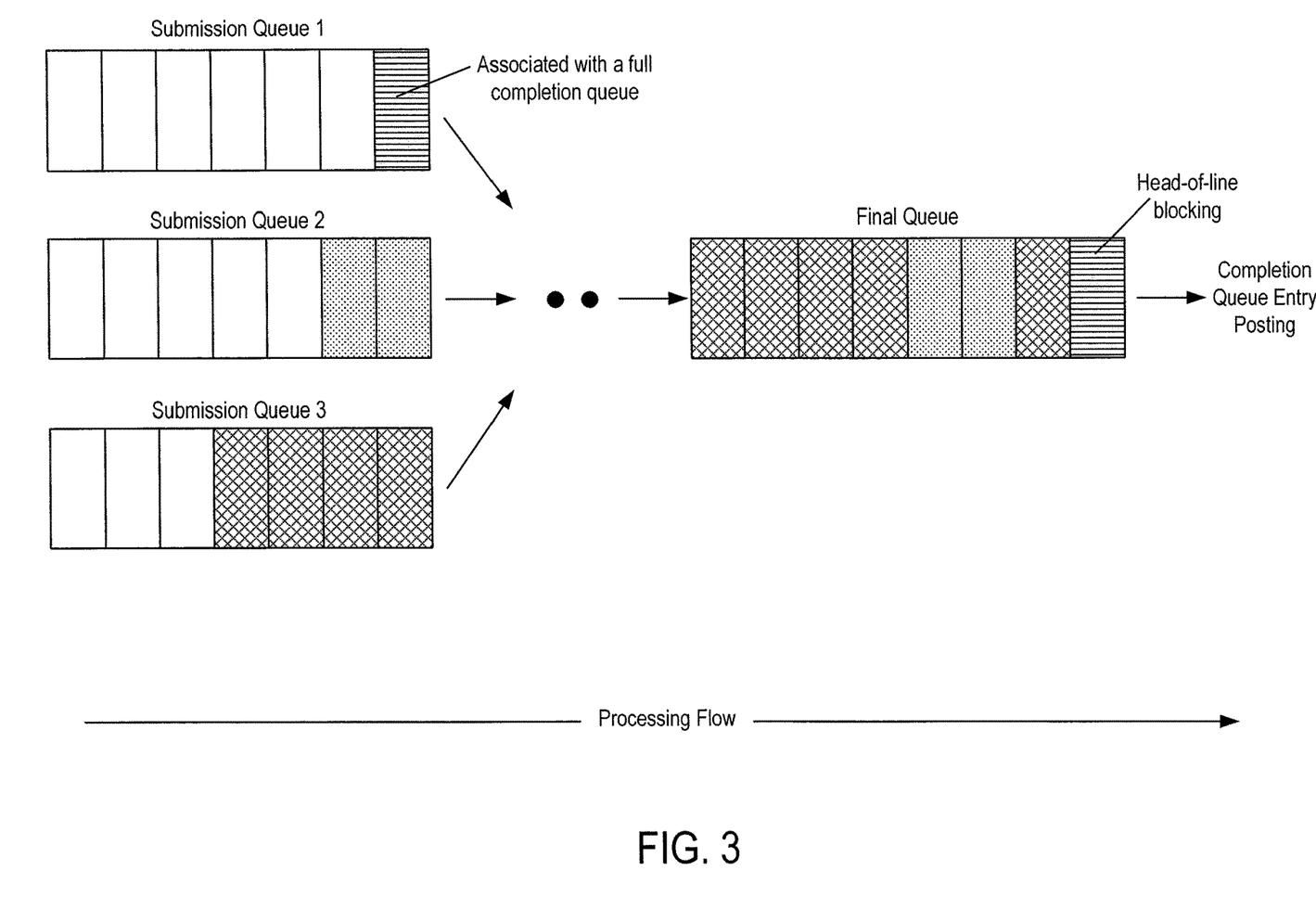
FIG. 3 is a diagram illustrating a head-of-line blocking issue in a completion path of an embodiment.

FIG. 3 illustrates the head-of-line blocking issue. In this example, three submission queues are illustrated, where the first one is associated with a full completion queue. The storage system 100 fetches the commands from the submission queues based on a round robin or weighted round robin algorithm, for example. Then, the storage system 100 processes the commands. Finally, the storage system 100 posts completion entries to the relevant completion queues. In FIG. 3, the final queue in the storage system 100 contains the completion entries, but everything is halted due to the fullness of one of the completion queue. The completion entry in submission queue 1 cannot be posted; therefore, other entries are blocked as well. This may lead to a back pressure to the other submission queues until the host empties this completion queue.

Some storage systems do not implement any special logic to make sure the head-of-line blocking due to completion queue fullness will not occur. The main drawback to such systems is that one application (SQn→CQn) has an impact on other applications (SQm→CQm while n≠m). This may be an issue in future enterprise solutions.

In other storage systems, commands are not removed from a submission queue until there is space available in the associated completion queue to process them. The main drawback to this approach is that significant performance degradation can be introduced when using completion queues with low queue depth. In this embodiment, the depth of a CQ is 1. This means that the host can get only a single CQ entry to that queue. The next entry will be queued only after host consumes the previous entry and updates the doorbell. In the event of not fetching commands from a SQ when not having space in the associated CQ, it becomes even worse. The storage system fetches a single command from a SQ while allocating a space in the CQ. Then, the storage system will not fetch the next command from that SQ until completing the execution of the command, posting the CQ entry and getting CQ doorbell notification from the host. This approach will "kill" the pipeline, and the commands will be executed one-by-one.

The following embodiments provide a mechanism for overcoming the head-of-line blocking issue due to fullness of a completion queue issue without introducing potential performance degradations in other scenarios. In one embodiment, an extra completion database (or, more generally, a data structure) is used that can temporarily store completion queue entries that cannot be posted to the host due to fullness of the relevant completion queues in the host memory. This database can be relatively very small in size but can have high benefit. In one embodiment, this internal, small database is implemented per CQ. So, the total depth of a CQ is {HostCqDepth+DeviceCqDepth}. In another embodiment, this internal, small database is a shared internal CQ data-based for all host CQs while the maximum number of allocated entries to a single CQ is limited. Other implementations are possible.

In one embodiment, the storage system 100 allocates a completion queue entry either in the relevant host completion queue or in the completion database prior to command fetching. The command can be a candidate for the command fetching arbitration only after a completion queue entry has been allocated for it. The storage system 100 can consider all outstanding commands while determining whether there is available slot for the next completion entry.

A completion entry may be allocated in any suitable way. For example, a completion entry can be allocated in the relevant host completion queue. If the associated completion queue is not full, the storage system 100 can allocate a completion entry in this CQ for the relevant command. This is done just before fetching the command from the host memory and can be implemented with two sets of tail pointers for each completion queue. The first tail (i.e., TAIL0) can be updated when posting a completion entry to the host. The second tail (i.e., TAIL1) can be updated just before fetching the command from a submission queue in order to accommodate the outstanding commands in the storage system 100. TAIL1 is used in order to determine whether it is allowed to fetch new commands.

As another example, a completion entry can be allocated in the global completion database implemented in the storage system 100. If the associated completion queue is full, the storage system 100 can allocate a completion entry in this global database while having some protection mechanisms, such as limiting by threshold the maximum number of entries that could be allocated for a specific SQ or CQ and limiting the maximum number of entries in this database. If a completion entry cannot be allocated, the associated submission queues can be disabled by the fetching logic until having space for allocating entries.

Figure 4:
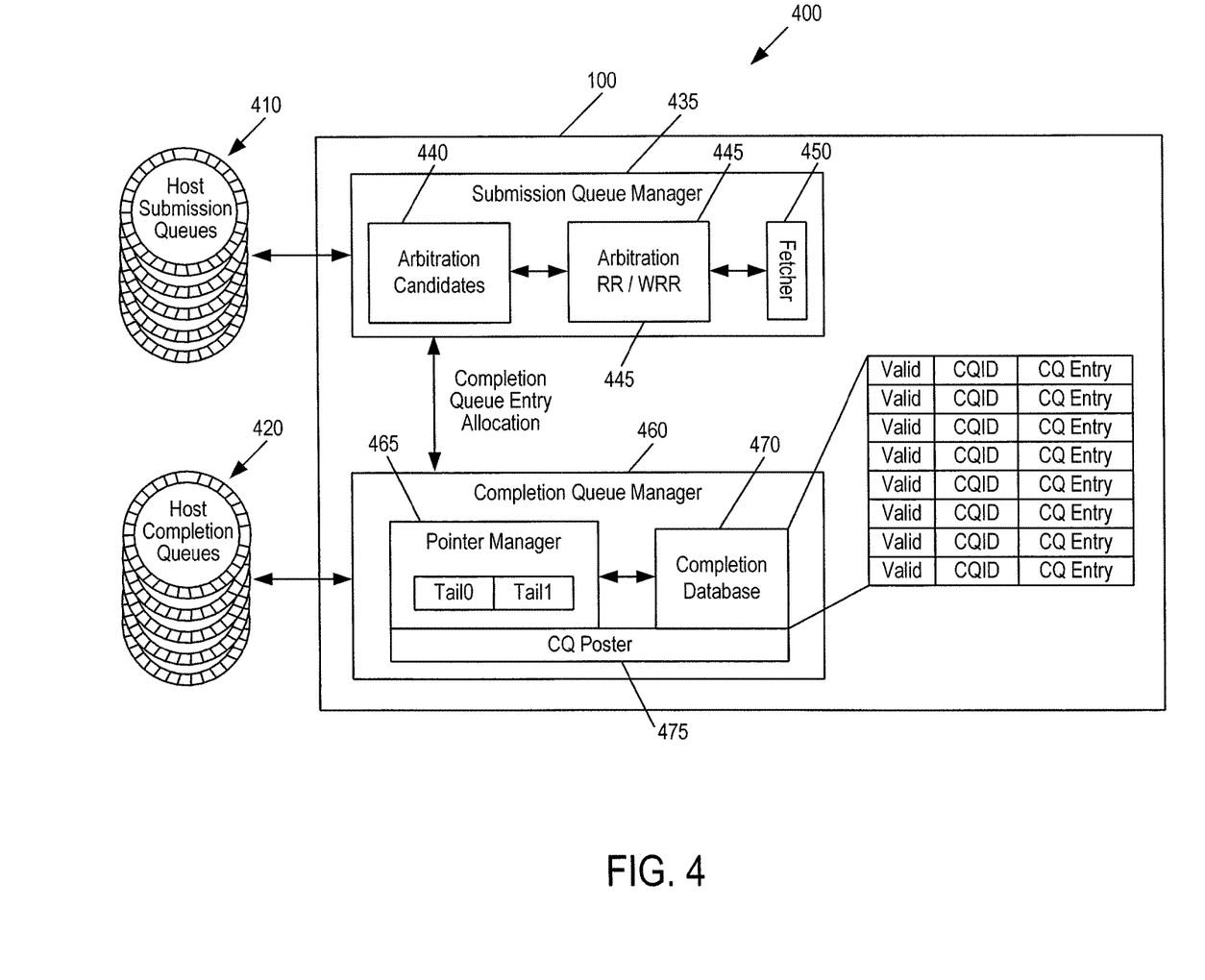
FIG. 4 is a block diagram of a head-of-line blocking solution of an embodiment.

Turning again to the drawings, FIG. 4 is a block diagram of a system 400 that can be used to implement these embodiments. Here, submission and completion queues 410, 420 are implemented in the host, and each submission queue is associated with a completion queue. The storage system 100 comprises a submission queue manager 435 and a completion queue manager 460. The submission queue manager 435 processes arbitration candidates 440 with an arbitration module 445 (e.g., using round robin (RR) or weighted round robin (WRR) 445 methods) and comprises a fetcher 450 to fetch commands. The completion queue manager 460 comprises a pointer manager 405, a completion database 470, and a CQ poster 475.

The submission queue manager 435 is responsible for handling SQ pointers, arbitrating among them, and fetching the commands. Before transferring a command fetch request from a specific submission queue, the submission queue manager 435 first makes sure there is a place in the associated completion queue to hold the associated completion entry. Furthermore, the submission queue manager 435 interacts with the completion queue manager 460 in order to allocate the relevant entry for this command. If there is not an available place in the associated completion queue, an entry may be allocated in the completion database. This may happen only when there are available entries in this storage and/or the number of already-allocated entries in this storage for this specific SQ or CQ does not exceed a preconfigured threshold. If a completion entry cannot be allocated, all associated submission queues with this completion queue can be temporarily disabled until the host consumes completion entries from the associated CQ. In this state, further commands are not fetched from all associated submission queues.

The completion queue manager 460 is responsible for handling CQ pointers, posting completion messages to the host, and managing completion storage by allocating and releasing entries. Just before fetching a command from a submission queue, the completion queue manager 460 allocates a completion entry for this command. If this allocation is failed, the command will not be fetched from the submission queue until having a space for holding the associated completion entry. The completion queue manager 460 allocates a completion entry in the associated completion queue when possible (e.g., when the completion queue is not full). Otherwise, a completion entry may be allocated in the extra completion database 470 implemented in the completion queue manager 460. This extra buffer 470 is implemented to avoid performance degradation when working in a low queue depth in the host completion queue.

In this embodiment, two sets of pointers are implemented in the completion queue manager 460 for each host completion queue. The first tail pointer (TAIL0) is updated whenever posting a completion queue entry. The second tail pointer (TAIL1) is updated just before fetching commands from the host submission queue. In this embodiment, the TAIL1 pointer is implemented so the logic will fetch commands only when having available space in the associated completion queue. When the CQ is full based on TAIL1 pointer, an entry might be allocated in the global completion database.

The completion database 470 holds completion entries that cannot be posted to the associated completion queue due to a fullness condition. Each entry in this storage 470 holds the content of the completion queue entry along with the completion queue ID (CQID) and a valid bit. When the relevant completion queue gets emptied by the host, the logic will first post entries from this database 470 to the relevant completion queue.

Figure 5:
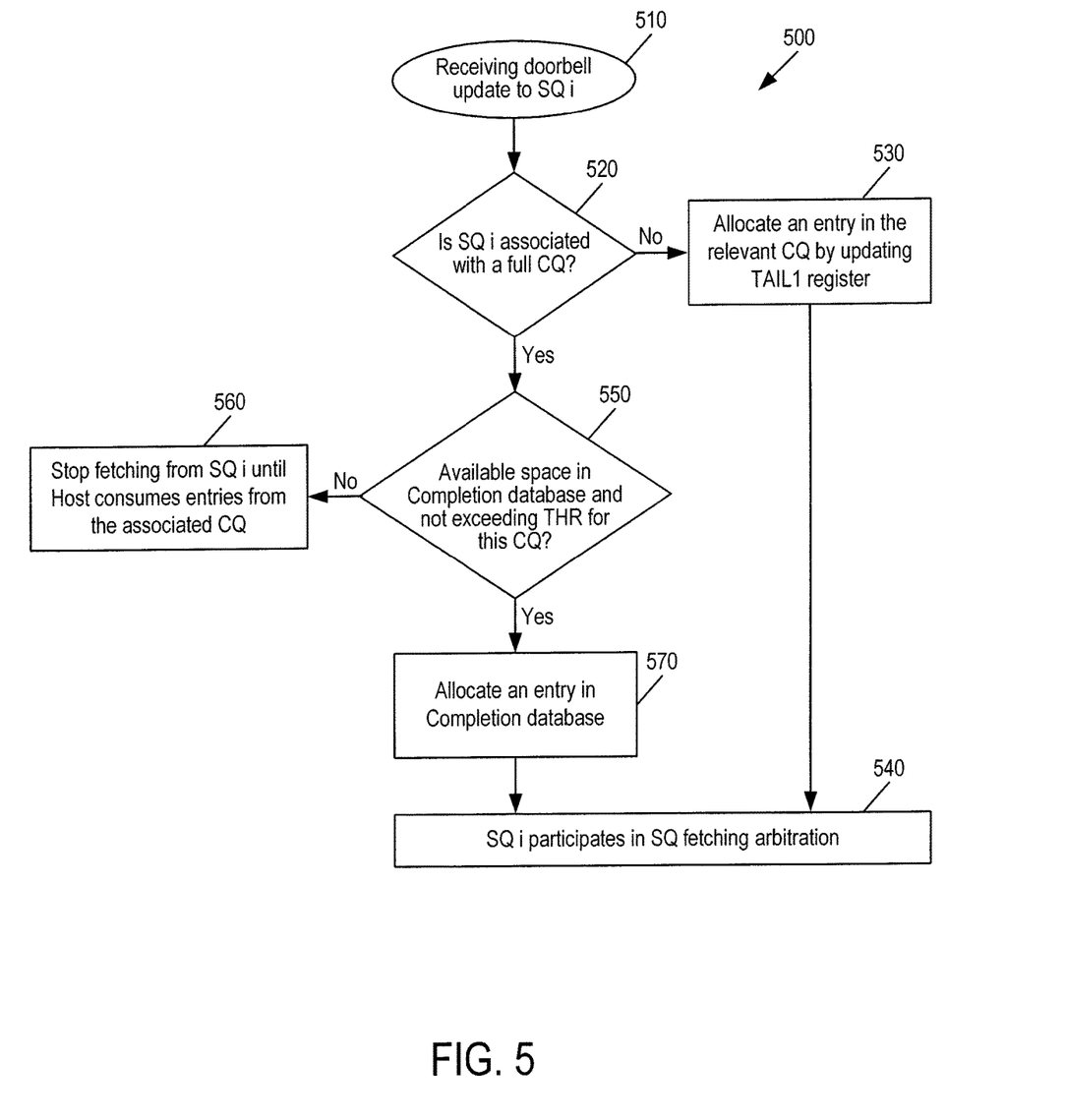
FIG. 5 is a flowchart of a method of an embodiment for receiving a submission queue doorbell.

FIG. 5 is a flowchart 500 that summarizes the steps implemented by storage system 100 when receiving a doorbell update to a specific submission queue (e.g., when the host queues a new command). As shown in FIG. 5, the storage system 100 receives a doorbell update to SQ i (act 510) and determines if SQ i is associated with a full CQ (act 520). If SQ i is not associated with a full CQ, the storage system 100 allocates an entry in the relevant CQ by updating the TAIL1 register (act 530). SQ i then participates in the SQ fetching operation (act 540). However, if SQ i is associated with a full CQ, the storage system 100 determines if there is available space in the completion database and/or if it does not exceed the threshold (THR) for this CQ (act 550). If the answer is no, the storage system 100 stops fetching from SQ i until the host consumes entries from the associated CQ (act 560). If the answer is yes, the storage system 100 allocates an entry in the completion database (act 570), and SQ i participates in the SQ fetching operation (act 540).

So, in this embodiment, if the SQ is associated with a non-full CQ, an entry is allocated in this CQ by updating the TAIL1 pointer, and the command will be fetched after participating in the SQ arbitration phase. If the associated CQ is full (considering the TAIL1 pointer), the storage system 100 allocates an entry in the completion database if possible and then the command will be fetched. If either the completion database is full and/or the number of entries in this storage 470 allocated for this SQ or CQ exceeds the preconfigured threshold, the logic will stop fetching more commands from all SQs associated with this CQ until more space will be available.

Figure 6:
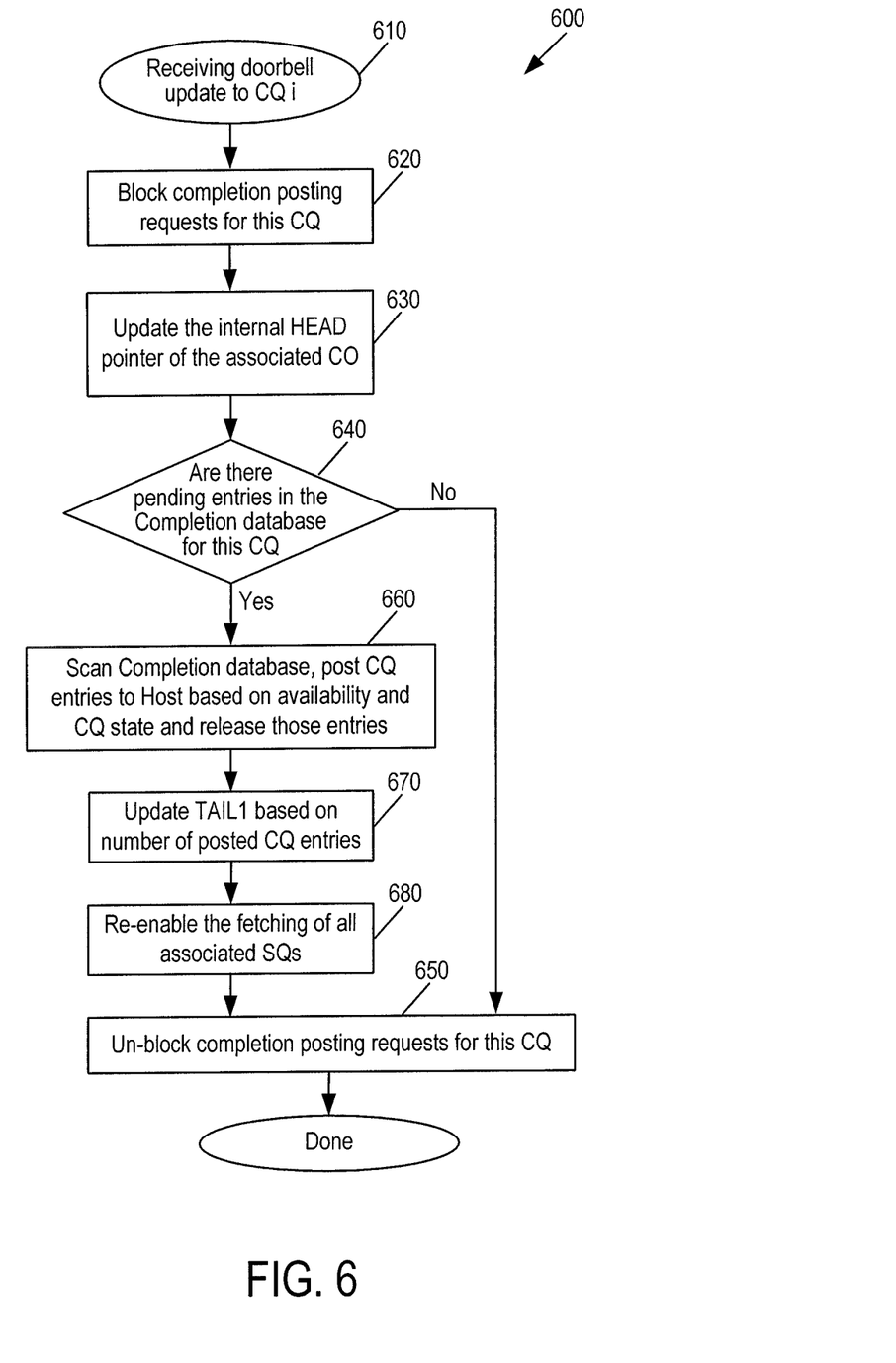
FIG. 6 is a flowchart of a method of an embodiment for receiving a completion queue doorbell.

FIG. 6 is a flowchart 600 that summarizes the steps implemented by the storage system 100 when receiving a doorbell update to a specific completion queue (e.g., the host consumes a completion entry). As shown in FIG. 6, the storage system 100 receives a doorbell update to CQ i (act 610). The storage system 100 then blocks completion posting requests for this CQ (act 620) and updates the internal head pointer of the associated CQ (act 630). Next, the storage system 100 determines if there are any pending entries in the completion database from this CQ (act 640). If there are not, the storage system 100 unblocks the completion pending requests for this CQ (act 650). If there are, the storage system 100 scans the completion queue database, posts CQ entries to the host based on availability and CQ state, and releases those entries (act 660). The storage system 100 then updates TAIL1 based on the number of posted CO entries (act 670) and re-enables the fetching of all the associated SQs (act 680). The storage system 100 then unblocks the completion pending requests for this CQ (act 650).

So, in this embodiment, the storage system 100 blocks all posting requests associated with this completion queue until completing the flow. Secondly, the internal head pointer is updated based on the written value by the host. If there are not any pending entries in the completion database associated with this CQ, the flow is completed after unblocking completion posting requests. Otherwise, the logic scans the completion database, posts CQ entries based on availability and CQ state, and releases the relevant entries. Next, TAIL1 is updated based on the number of posted CQ entries and the associated SQs that were disabled will be enabled for more fetching operations. Finally, further completion posting requests will be processed by this logic, and the fetching operation from the associated SQs will be enabled again.

There are several advantages associated with these embodiments. For example, using these embodiments, the head-of-line blocking issue due to completion queue fullness can be prevented without introducing any performance degradation in host platforms that work with low queue depth in completion queues. This is achieved by the extra completion database implemented in the storage system 100 and the logic that is responsible for managing this buffer.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
    a memory configured to store a data structure; and
    a controller in communication with the memory, wherein the controller is configured to:
        determine that a completion queue in a host is too full to store a completion entry;
        in response to determining that the completion queue in the host is too full to store the completion entry, temporarily store the completion entry in the data structure in the storage system;
        determine that space has become available in the completion queue in the host to store the completion entry; and
        in response to determining that space has become available in the completion queue in the host to store the completion entry, store, in the completion queue in the host, the completion entry that was temporarily stored in the data structure in the storage system.

2. The storage system of claim 1, wherein the controller is further configured to temporarily store the completion entry in the data structure in the storage system in response to there being available space in the data structure and/or in response to a threshold not being exceeded for the data structure.

3. The storage system of claim 1, wherein the controller is further configured to stop fetching commands from a submission queue in the host until space is available in the completion queue and/or the data structure.

4. The storage system of claim 1, wherein the controller is further configured to:
in response to receiving a doorbell update to the completion queue from the host:
block completion entries from being posted to the completion queue;
update a head pointer of the completion queue;
determine whether there are any pending completion entries in the data structure; and
in response to determining that there are no pending completion entries in the data structure, unblock completion entries from being posted to the completion queue.

5. The storage system of claim 1, wherein the controller is further configured to:
in response to determining that there are pending completion entries in the data structure:
select a completion entry from the data structure;
update a tail pointer based on a number of completion entries in the data structure;
post aggregated completion entries to the completion queue;
enable fetching from a submission queue in the host; and
unblock completion entries from being posted to the completion queue.

6. The storage system of claim 1, wherein the memory comprises a three-dimensional memory.

7. The storage system of claim 1, wherein the storage system is embedded in the host.

8. The storage system of claim 1, wherein the storage system is configured to be removably connected to the host.

9. A method for preventing head-of-line blocking in a completion path, the method comprising:
performing the following in a storage system in communication with a host, wherein the host comprises a submission queue and a completion queue:
determining whether a completion queue entry can be posted to the completion queue;
in response to determining that the completion queue entry can be posted to the completion queue:
allocating an entry in the completion queue; and
fetching a command from the submission queue; and
in response to determining that the completion queue entry cannot be posted to the completion queue:
allocating an entry in a completion data structure in the storage system; and
fetching a command from the submission queue.

10. The method of claim 9, wherein the storage system allocates the entry in the completion queue by updating a tail pointer.

11. The method of claim 9, further comprising:
determining whether there is available space in the completion data structure and/or whether a threshold is not exceeded for the completion data structure, wherein an entry is allocated in the completion data structure in response to there being available space in the completion data structure and/or in response to the threshold not being exceeded.

12. The method of claim 11, further comprising:
in response to determining that there is no available space in the completion data structure and/or in response to determining that the threshold has been exceeded, stopping fetching commands from the submission queue until space is available in the completion queue and/or the completion data structure.

13. The method of claim 9, further comprising:
in response to receiving a doorbell update to the completion queue from the host:
blocking completion entries from being posted to the completion queue;
updating a head pointer of the completion queue;
determining whether there are any pending completion entries in the completion data structure; and
in response to determining that there are no pending completion entries in the completion data structure, unblocking completion entries from being posted to the completion queue.

14. The method of claim 9, further comprising:
in response to determining that there are pending completion entries in the completion data structure:
selecting a completion entry from the completion data structure;
updating a tail pointer based on a number of completion entries in the completion data structure;
posting aggregated completion entries to the completion queue;
enabling fetching from the submission queue; and
unblocking completion entries from being posted to the completion queue.

15. A storage system comprising:
means for determining that a completion queue in a host is too full to store a completion entry;
means for, in response to determining that the completion queue in the host is too full to store the completion entry, temporarily storing the completion entry in a data structure in the storage system; and
means for, in response to determining that space has become available in the completion queue in the host to store the completion entry, storing, in the completion queue in the host, the completion entry that was temporarily stored in the data structure in the storage system.

16. The storage system of claim 15, further comprising means for temporarily storing the completion entry in the data structure in the storage system in response to determining that there is available space in the data structure and/or in response to determining that a threshold is not exceeded for the data structure.

17. The storage system of claim 15, further comprising means for blocking completion entries from being posted to the completion queue in response to receiving a doorbell update to the completion queue from the host.

18. The storage system of claim 15, further comprising a three-dimensional memory.

19. The storage system of claim 15, wherein the storage system is embedded in the host.

20. The storage system of claim 15, wherein the storage system is configured to be removably connected to the host.

* * * * *